US012747359B2

(12) United States Patent
Sisto

(10) Patent No.: US 12,747,359 B2
(45) Date of Patent: Sep. 29, 2026

(54) REMOVABLE PROTECTIVE COATING

(71) Applicant: Salto, LLC, Philadelphia, PA (US)

(72) Inventor: Salvatore Sisto, East Brunswick, NJ (US)

(73) Assignee: Salto, LLC

(*) Notice: Subject to any disclaimer, the term of this patent is extended or adjusted under 35 U.S.C. 154(b) by 240 days.

(21) Appl. No.: 18/387,653

(22) Filed: Nov. 7, 2023

(65) Prior Publication Data

US 2024/0150581 A1 May 9, 2024

Related U.S. Application Data

(60) Provisional application No. 63/423,567, filed on Nov. 8, 2022.

(51) Int. Cl.

| | |
|---|---|
| ***C09D 5/00*** | (2006.01) |
| ***C09D 5/02*** | (2006.01) |
| ***C09D 7/40*** | (2018.01) |
| ***C09D 7/65*** | (2018.01) |

(52) U.S. Cl.

CPC ............. *C09D 5/002* (2013.01); *C09D 5/021* (2013.01); *C09D 7/65* (2018.01); *C09D 7/70* (2018.01)

(58) Field of Classification Search

CPC .......... C09D 5/002; C09D 5/021; C09D 7/65; C09D 7/70

See application file for complete search history.

(56) References Cited

U.S. PATENT DOCUMENTS

| | | | | |
|---|---|---|---|---|
| 3,030,251 A | 4/1962 | La Bore et al. | | |
| 3,578,550 A * | 5/1971 | Hoerner et al. ........ | E04F 11/16 428/215 | |
| 2009/0214814 A1 * | 8/2009 | Rintoul, Jr. .............. | B05D 7/08 428/141 | |

FOREIGN PATENT DOCUMENTS

| | | |
|---|---|---|
| WO | 2008/063411 A2 | 5/2008 |
| WO | 2019/084889 A1 | 5/2019 |

OTHER PUBLICATIONS

English translation for Gawa et al (JP 2010229180 A) (Year: 2010).*

* cited by examiner

*Primary Examiner* — Nathan L Van Sell
(74) *Attorney, Agent, or Firm* — The Belles Group, P.C.

(57) ABSTRACT

Described herein is a protective coating comprising a first major surface opposite a second major surface, the protective laminate comprising: a first layer comprising a first polymer, the first layer having a first thickness; a second layer comprising a particulate having an average particulate size; wherein the average particle size is greater than the first thickness of the first layer, and wherein at least a first portion of the particulate penetrates into the first layer thereby overlapping with at least a portion of the first thickness, and wherein a second portion of the particulate sits above the first layer; wherein the second major surface of the protective laminate comprises the first layer; and wherein the first major surface of the protective laminate comprises a varied topography formed in part by the second portion of the particulate.

14 Claims, 5 Drawing Sheets

REMOVABLE PROTECTIVE COATING

CROSS-REFERENCE TO RELATED APPLICATIONS

The present application claims priority to U.S. Provisional Patent Application Ser. No. 63/423,567, filed Nov. 8, 2022, the entirety of which is incorporated herein by reference.

BACKGROUND

Construction of home and commercial buildings require the installation of various surfaces at varying times over the course of the project—which may lead to such surfaces being damaged if installed before work can be completed. Therefore, a need exists to protect such surfaces during construction.

BRIEF SUMMARY

The present invention is directed to a protective coating comprising a first major surface opposite a second major surface, the protective laminate comprising: a first layer comprising a first polymer, the first layer having a first thickness; a second layer comprising a particulate having an average particulate size; wherein the average particle size is greater than the first thickness of the first layer, and wherein at least a first portion of the particulate penetrates into the first layer thereby overlapping with at least a portion of the first thickness, and wherein a second portion of the particulate sits above the first layer; wherein the second major surface of the protective laminate comprises the first layer; and wherein the first major surface of the protective laminate comprises a varied topography formed in part by the second portion of the particulate.

Other embodiments of the present invention include a protective covering system comprising: a substrate comprising an exposed major surface; a first layer applied to the exposed major surface of the substrate, the first layer comprising a first material; a second layer comprising a particulate applied to the first layer, a first portion of the particulate penetrating into the first layer and a second portion of the particulate sits above the first layer; wherein the second portion of the particulate sitting above the first layer forms a varied topography; and wherein the first material is removably bonded to the exposed major surface of the substrate.

Other embodiments of the present invention include a method of applied a protective coating comprising a) spray applying a first layer to an exposed surface of a substrate, the first layer comprises a first material and the first layer being continuous; b) applying a second layer to the first layer, the second layer comprising a particulate and the second layer being discontinuous, whereby the a first portion of the particulate at least partially penetrates into the first layer and a second portion of the particulate sits above the first layer to form a varied topography; wherein the first material is removably bonded to the exposed surface of the substrate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
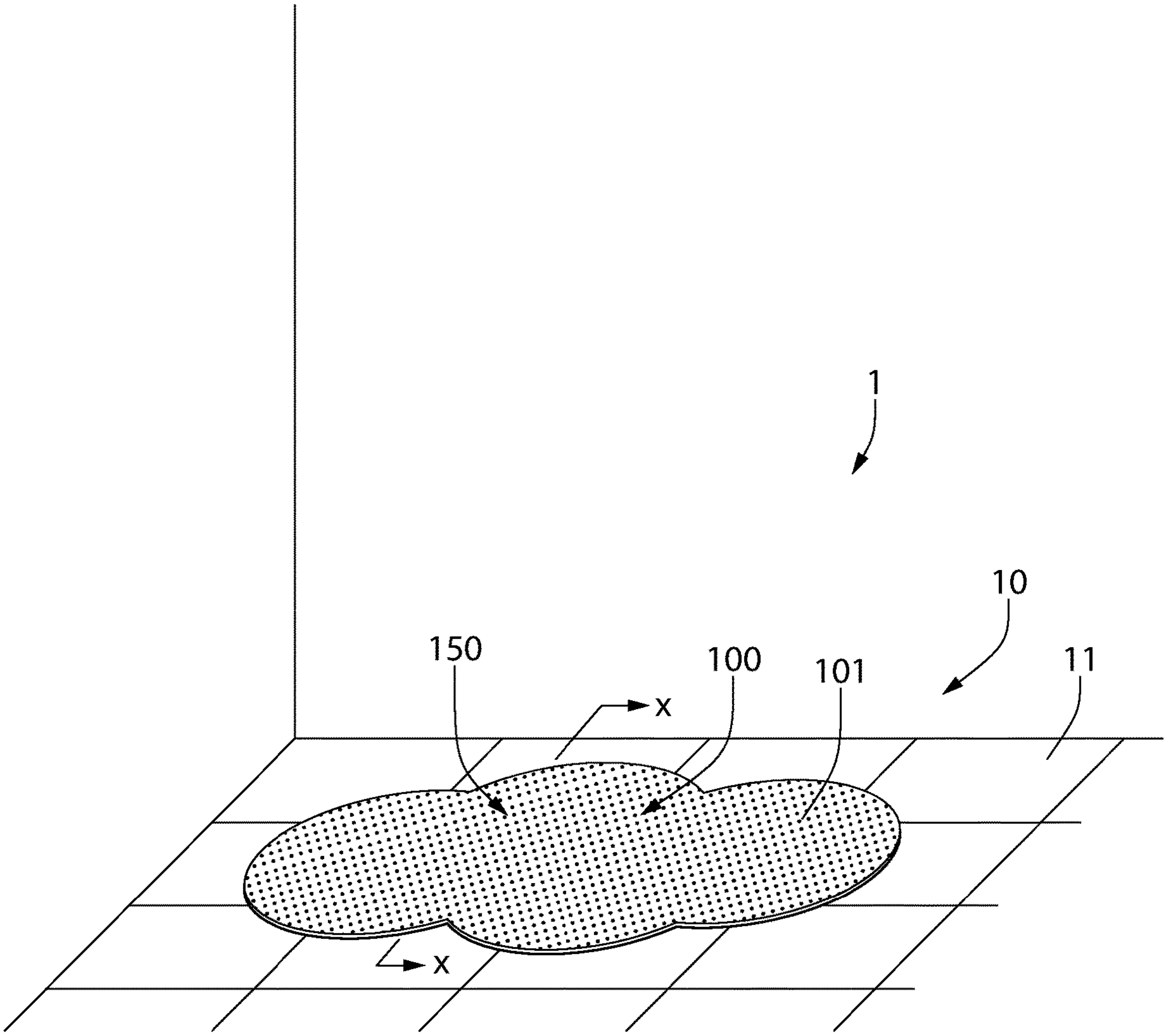
FIG. 1 is perspective view of a protective coating system comprising a protective coating according to the present invention.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as “lower,” “upper,” “horizontal,” “vertical,” “above,” “below,” “up,” “down,” “top,” and “bottom” as well as derivatives thereof (e.g., “horizontally,” “downwardly,” “upwardly,” etc.) should be construed to refer to the orientation as then described or as shown in the drawing under discussion. These relative terms are for convenience of description only and do not require that the apparatus be constructed or operated in a particular orientation unless explicitly indicated as such.

Terms such as “attached,” “affixed,” “connected,” “coupled,” “interconnected,” and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term “about” means+/−5% of the reference value. According to the present application, the term “substantially free” less than about 0.1 wt. % based on the total of the referenced value.

Referring to FIG. 1, the present invention includes a protective coating 100. The present invention may further include a protective covering system 1 that comprises the protective coating 100. The protective covering system 1 may comprise a substrate 10, wherein the substrate 10 may comprise an exposed major surface 11. The exposed major surface 11 of the substrate 10 may be a floor surface. The exposed major surface 11 of the substrate 10 may be a bathroom surface—such as, but not limited to, a tub surface, sink surface, a tiled surface, a shower pan surface. In other embodiments, the exposed major surface 11 of the substrate 10 may be a floor surface of a living room, kitchen, bedroom, and/or hallway. Although not pictured, the exposed major surface 11 of the substrate 10 may be a surface of car body panel.

The protective coating 100 may function as a temporary protective layer that shields the underlying substrate 10 from damage that may occur in the time between installation and completion of construction of an environment that includes such substrate 10. In a non-limiting example, a substrate 10 that is a shower pan surface may have the protective coating 100 applied thereto, whereby the coated shower pan may be installed into a bathroom before tile-work on the walls is completed. The protective coating 100 may function as a temporary protective layer for that shower pan, thereby shielding that shower pan from damage that may otherwise occur while wall-tile is later installed—such as, but not limited to, work-boot scuffs, mortar drips, grout drips, falling tools, etc. Once installation work is complete and the room is ready for regular use, the protective coating 100 may be removed to expose the substrate surface.

Although not pictured, the protective coating 100 may be applied to a substrate surface of a substrate at the time of manufacturing such substrate and before shipment of such substrate to a secondary location, such as a retail store or installation location. In such embodiments, the protective coating 100 may double as both a temporary protective layer during the installation period (as discussed previously) as well as function as a shipment packaging material to be used in part to protect such substrate during transportation of the substrate from the manufacturing plant to the second location.

Figure 2A:
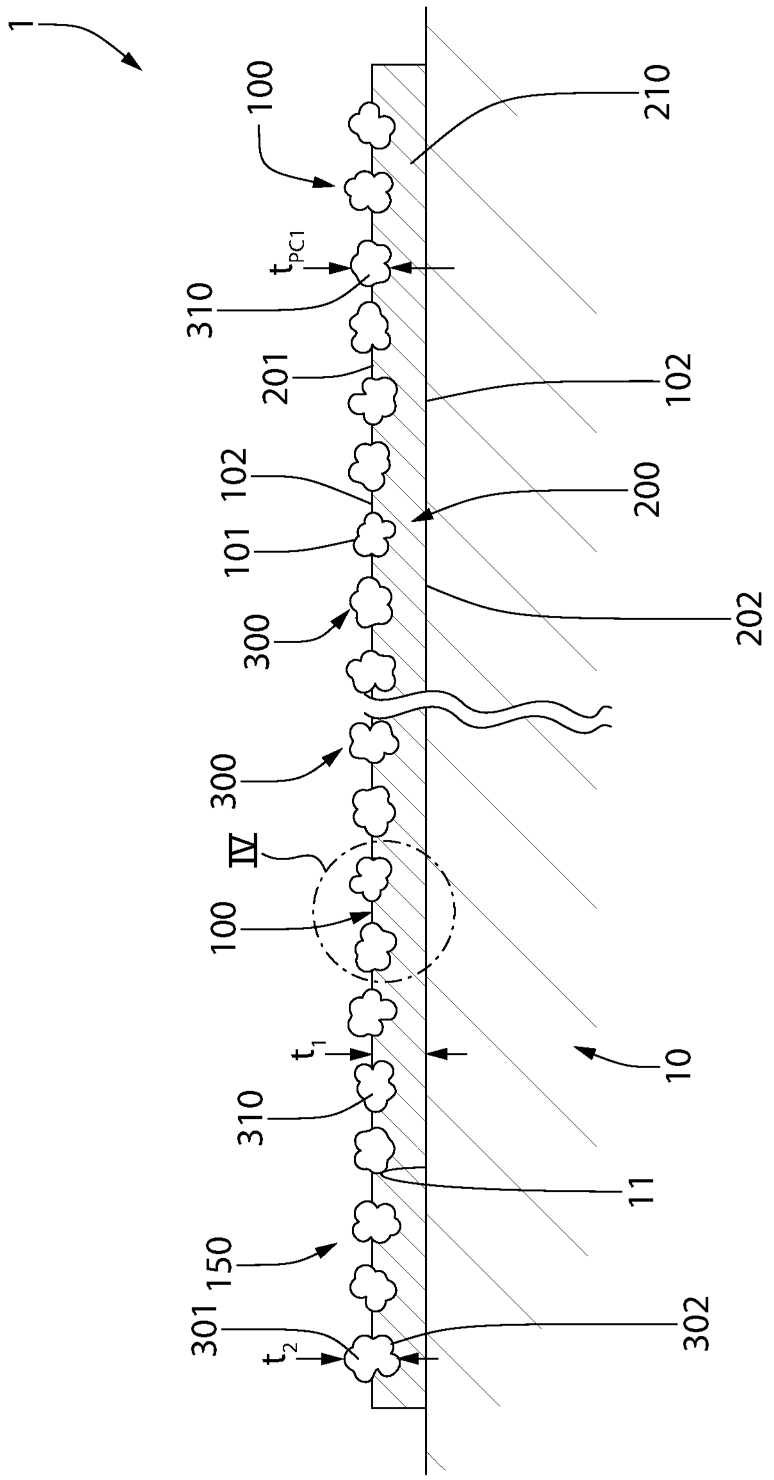
FIG. 2A is a cross-sectional view of the protective coating system of FIG. 1 along line X-X.

Referring now to FIG. 2A, the protective coating 100 may comprise a first major surface 101 opposite a second major surface 102. The second major surface 102 of the protective coating 100 may face the exposed major surface 11 of the substrate 10. The second major surface 102 of the protective coating 100 may be in contact with the exposed major surface 11 of the substrate 10. The first major surface 101 of the protective coating 100 may face away from the exposed major surface 11 of the substrate 10.

The protective coating 100 may be removably bonded to the substrate 10. The protective coating 100 may be removably bonded to the exposed major surface 11 of the substrate 10. The term "removably bonded" refers to a temporary bond formed between two reference surfaces, whereby the temporary bond allows such surfaces to remain in contact without external forces but may be separated at a later time without chemical modification (e.g., solvent dissolution) or excessive machining steps—in a non-limiting example, removably bonded may refer to the protective coating 100 being bonded to the substrate 10, whereby the protective coating may be later peeled from such substrate 10 by hand without needing powered tools or solvent.

The protective coating 100 may have an overall thickness $t_{PC1}$ as measured between the first major surface 101 and the second major surface 102. The overall thickness $t_{PC1}$ may range from about 70 mils to about 200 mils—including all thicknesses and sub-ranges there-between.

The protective coating 100 may comprise a first layer 200. The first layer 200 may comprise a first material 210. The first material 210 may form a matrix of the first layer 200. The first material may comprise a first polymer. The first layer 200 may be formed of a first coating composition comprising the first material and a liquid carrier. The first coating composition may comprise a defoamer. The liquid carrier may comprise water. The first coating composition may be a sprayable-composition.

The first layer 200 may comprise a first upper surface 201 opposite a first lower surface 202. The first layer 200 have a first thickness $t_1$ as measured between the first upper surface 201 and the first lower surface 202 of the first layer 200. The first thickness $t_1$ may range from about 1 mil to about 20 mil—including all thicknesses and sub-ranges there-between. In some embodiments, the first thickness $t_1$ may range from about 5 mil to about 10 mil—including all thicknesses and sub-ranges there-between. The first layer 200 may be applied to the exposed major surface 11 of the substrate 10. The first layer 100 may be in contact with the exposed major surface 11 of the substrate 10.

The first layer 200 may be removably bonded to the substrate 10. The first layer 200 may be removably bonded to the exposed major surface 11 of the substrate 10. The first lower surface 201 of the first layer 200 may be removably bonded to the substrate 10. The first lower surface 201 of the first layer 100 may be removably bonded to the exposed major surface 11 of the substrate 10.

The first layer 200 may be continuous. The term "continuous" refers to the first layer 200 being free of discrete voids extending between the first upper surface 201 and the first lower surface 202 of the first layer 200.

The first lower surface 202 of the first layer 200 may form the second major surface 102 of the protective coating 100. State otherwise, the second major surface 102 of the protective coating 100 may comprise the first lower surface 202 of the first layer 200.

The protective coating 100 may comprise a second layer 300. The second layer 300 may be applied to the first layer 200. The second layer 300 may be in contact with the first layer 300.

The second layer 300 may comprise a second material. The second material may comprise a particulate 310. In some embodiments, the particulate 310 may have an overall particulate size that is greater than the first thickness $t_1$.

The particulate 310 may be selected from one or more of a fibrous material, polymeric material, inorganic material, and combinations thereof. The fibrous material may be selected from natural wood fiber, composite wood fiber, textile material, and blends thereof. Non-limiting examples of wood fiber include saw dust of natural woods. Non-limiting examples of composite wood fiber include MDF, plywood, and combinations thereof—including dust of MDF, plywood, etc. Non-limiting examples of polymeric material include rubber and silicones. The wood fiber may be a recycled material—such as a waste material from production of other products. The wood fiber may be a dust. The particulate 310 may be a water-absorbable material. In some embodiments, the fibrous material may be a water-absorbable material. Non-limiting examples of the inorganic material may include a marble dust.

The second layer 300 may be formed of a second coating composition comprising the second material in a dry state (i.e., free of liquid carrier). The second coating composition may be applied by spray. The spray of the second coating composition may be a dry-spray—i.e., free of liquid carrier.

The second layer 300 may comprise a second upper surface 301 opposite a second lower surface 302. The second layer 300 have a second thickness $t_2$ as measured between the second upper surface 301 and the second lower surface 302 of the second layer 300.

The second layer 300 may be discontinuous. The term "discontinuous" refers to the second layer 300 comprises discrete voids extending between the second upper surface 301 and the second lower surface 302 of the first layer 200.

The average particle size of the particulate 310 may be greater than the first thickness $t_1$ of the first layer 200. The particle size of the particulate 310 may encompass a range of sizes that include a particle size greater than the first thickness $t_1$ of the first layer 200.

Figure 2B:
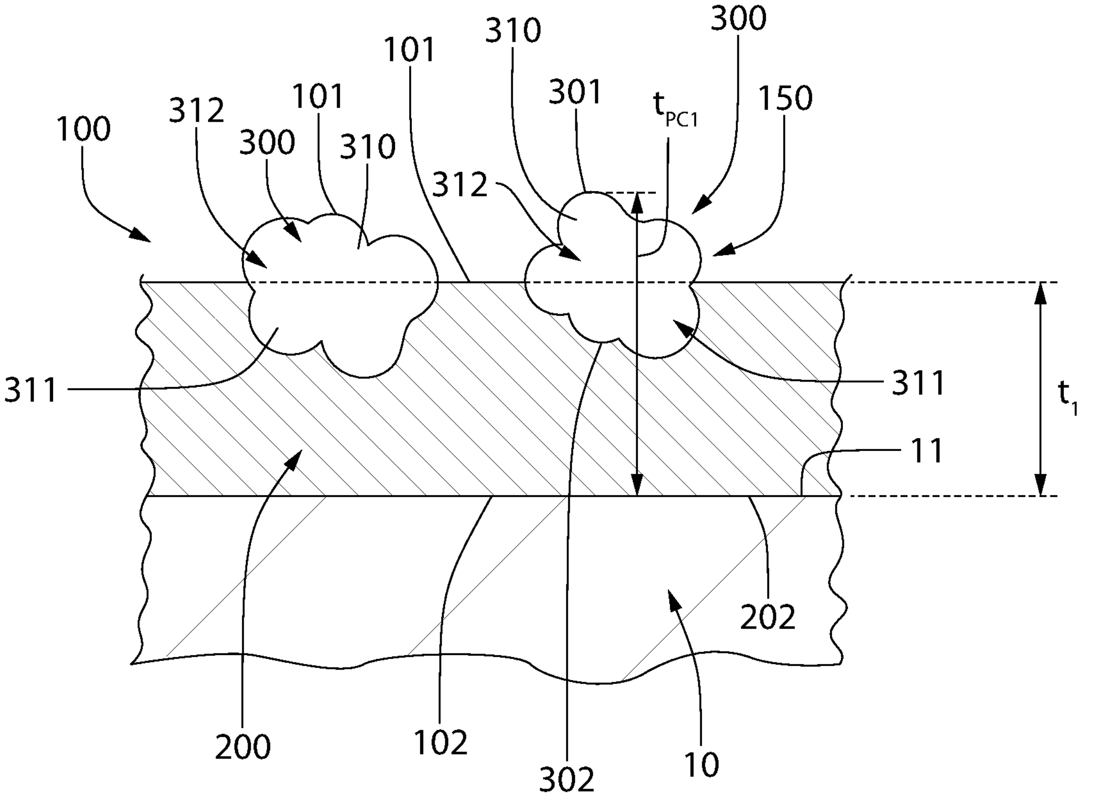
FIG. 2B is a close-up view of region IV in FIG. 2A.

Referring now to FIG. 2B, the second layer 300 and the first layer 200 may be arranged such that the particulate 310 may comprise a first portion 311 and a second portion 312. The first portion 311 of the particulate 310 may at least partially penetrate into the first layer 200. The first portion 311 of the particulate 310 may at least partially penetrate into the first layer 200 thereby overlapping with the first thickness $t_1$ of the first layer 200. The first portion 311 of the particulate 310 may at least partially penetrate into the first layer 200 thereby being located between the first upper surface 201 and the first lower surface 202 of the first layer 200.

The second portion 312 of the particulate 310 may be located above the first layer 200. The second portion 312 of the particulate 310 may be located above the first layer 200 such that the particulate 310 does not overlap with the first thickness $t_1$ of the first layer 200. The second portion 312 of the particulate 310 may be located above the first layer 200.

The second portion 312 of the particulate 310 located above the first layer 200 may create a varied topography 150 on the first major surface 101 of the protective coating 100. Stated otherwise, the first major surface 101 of the protective coating 100 may comprise a varied topography that is the result of the second portion 312 of the particulate 310 that extends beyond the first upper surface of the first layer 200.

According to some of the embodiments shown in FIGS. 2A and 2B, the first major surface 101 of the protective coating 100 may be formed by second upper surface 301 of the second layer 300. According to some of the embodiments shown in FIGS. 2A and 2B, the first major surface 101 of the protective coating 100 may be formed by a combination of the second upper surface 301 of the second layer 300 and the first upper surface 201 of the first layer 200—whereby the discontinuous nature of the second layer 300 allows for the both first layer 200 and second layer 300 to form at least part of the first major surface 101 of the protective coating.

The protective coating 100 may be formed by spray applying the first coating composition to the exposed major surface 11 of the substrate 10 in the wet-state (i.e., with liquid carrier). The first coating composition may be spray applied in a single coating. In other embodiments, the first coating composition may be spray applied in multiple coatings. Subsequently, before the first coating composition is fully dried (i.e., before the liquid carrier is evaporated), the second coating composition is applied to the layer of the first coating composition. Subsequently, the liquid carrier of the first coating composition may be driven off (e.g., evaporated) to form the protective coating 100 for a drying period.

In some embodiments, the particulate 310 may be a water absorbable material thereby reducing the amount of time necessary to complete the drying period. In some embodiments, the drying period may be accelerated by heating the previously applied first coating composition and second coating composition and substrate to an elevated drying temperature. The elevated drying temperature may be achieved by an oven, IR lamp, and combinations thereof.

Figure 3A:
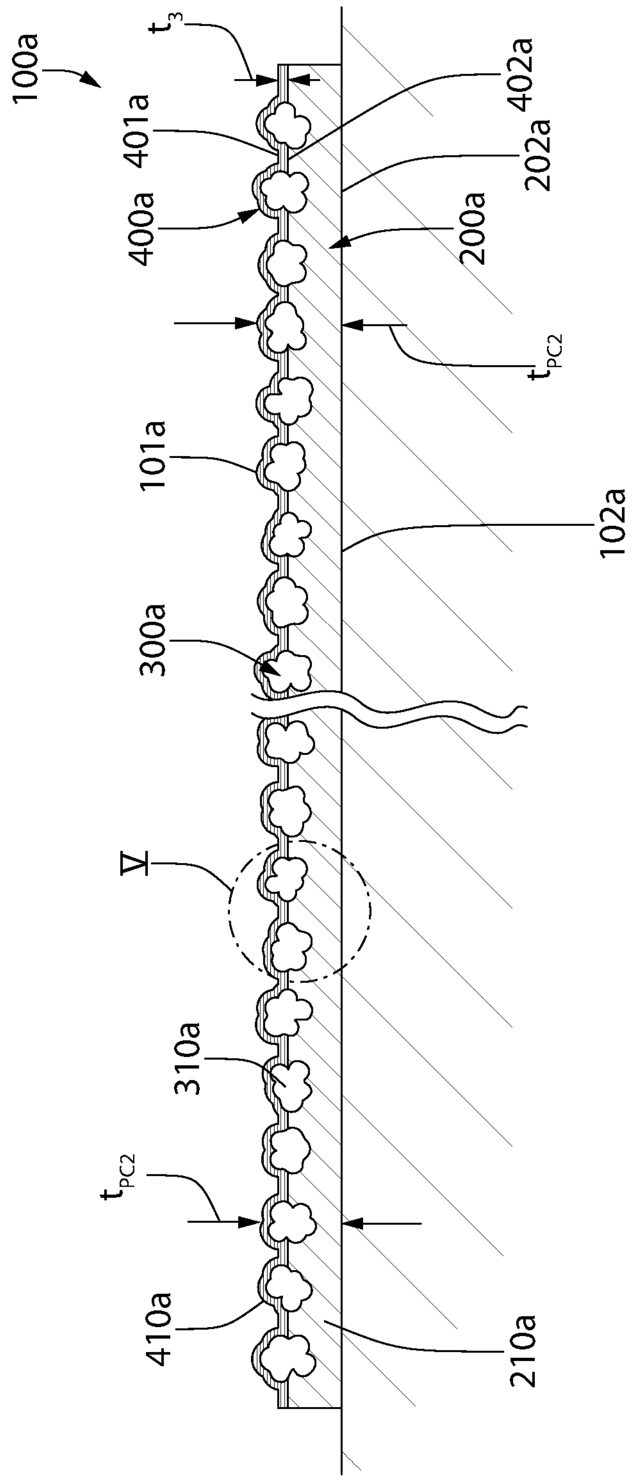
FIG. 3A is a cross-sectional view of the protective coating according to another embodiment of FIG. 1 along line X-X.
Figure 3B:
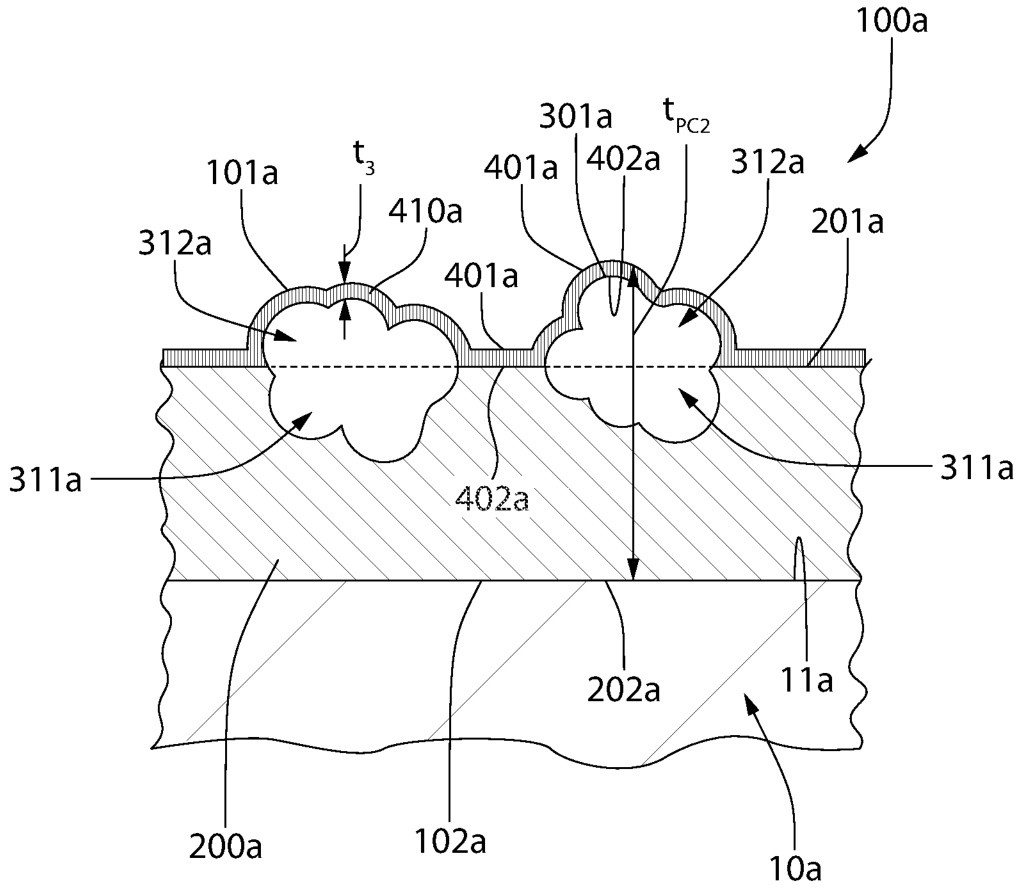
FIG. 3B is a close-up view of region V in FIG. 2B.

Referring now to FIGS. 3A and 3B, a protective coating 100*a* is illustrated in accordance with another embodiment of the present invention. The protective coating 100*a* is similar to the protective coating 100 except as described herein below. The description of the protective coating 100 above generally applies to the protective coating 100*a* described below except with regard to the differences specifically noted below. A similar numbering scheme will be used for the protective coating 100*a* as with the protective coating 100 except that the a-suffix of each element number will be used.

The protective coating 100*a* may comprise a first major surface 101*a* opposite a second major surface 102*a*. The second major surface 102*a* of the protective coating 100*a* may face the exposed major surface 11*a* of the substrate 10*a*. The second major surface 102*a* of the protective coating 100*a* may be in contact with the exposed major surface 11*a* of the substrate 10*a*. The first major surface 101*a* of the protective coating 100*a* may face away from the exposed major surface 11*a* of the substrate 10*a*.

The protective coating 100*a* may be removably bonded to the substrate 10*a*. The protective coating 100*a* may be removably bonded to the exposed major surface 11*a* of the substrate 10*a*. The protective coating 100*a* may have an overall thickness $t_{PC2}$ as measured between the first major surface 101 and the second major surface 102.

The protective coating 100*a* may comprise a first layer 200*a*. The first layer 200*a* may comprise a first material 210*a*. The first material 210*a* may form a matrix of the first layer 200*a*. The first material may comprise a first polymer.

The first layer 200*a* may comprise a first upper surface 201*a* opposite a first lower surface 202*a*. The first layer 200*a* have a first thickness $t_1$ as measured between the first upper surface 201*a* and the first lower surface 202*a* of the first layer 200*a*. The first layer 200*a* may be applied to the exposed major surface 11*a* of the substrate 10*a*. The first layer 100*a* may be in contact with the exposed major surface 11*a* of the substrate 10*a*.

The first layer 200*a* may be removably bonded to the substrate 10*a*. The first layer 200*a* may be removably bonded to the exposed major surface 11*a* of the substrate 10*a*. The first lower surface 201*a* of the first layer 200*a* may be removably bonded to the substrate 10*a*. The first lower surface 201*a* of the first layer 100*a* may be removably bonded to the exposed major surface 11*a* of the substrate 10*a*.

The first layer 200*a* may be continuous. The first lower surface 202*a* of the first layer 200*a* may form the second major surface 102*a* of the protective coating 100*a*. State otherwise, the second major surface 102*a* of the protective coating 100*a* may comprise the first lower surface 202*a* of the first layer 200*a*.

The protective coating 100*a* may comprise a second layer 300*a*. The second layer 300*a* may be applied to the first layer 200*a*. The second layer 300*a* may be in contact with the first layer 300*a*.

The second layer 300*a* may comprise a second material. The second material may comprise a particulate 310*a*. The particulate 310*a* may be selected from one or more of a fibrous material, polymeric material, inorganic material, and combinations thereof. The fibrous material may be selected from natural wood fiber, composite wood fiber, and blends thereof. Non-limiting examples of composite wood fiber include MDF, plywood, and combinations thereof. Non-limiting examples of polymeric material include rubber and silicones.

The second layer 300*a* may comprise a second upper surface 301*a* opposite a second lower surface 302*a*. The second layer 300*a* have a second thickness $t_2$ as measured between the second upper surface 301*a* and the second lower surface 302*a* of the second layer 300*a*.

The second layer 300*a* may be discontinuous. The average particle size of the particulate 310*a* may be greater than the first thickness $t_1$ of the first layer 200*a*. The particle size of the particulate 310*a* may encompass a range of sizes that include a particle size greater than the first thickness $t_1$ of the first layer 200*a*.

The protective coating 100*a* may comprise a third layer 400*a*. The third layer 400*a* may comprise a third material 410*a*. The third material 410*a* may form a matrix of the third layer 400*a*. The third material may comprise a second polymer. In some embodiments, the third material may be the same as the first material. In other embodiments, the third material and the first material may be different.

The third layer 400*a* may comprise a third upper surface 401*a* opposite a third lower surface 402*a*. The third layer 400*a* have a third thickness $t_3$ as measured between the third upper surface 401*a* and the third lower surface 402*a* of the third layer 400*a*. The third layer 400*a* may be applied to second layer 300*a*. The third layer 400*a* may be applied to the portions of the first layer 200*a* that remain exposed from the discrete voids in the discontinuous second layer 300*a*.

The third layer 400*a* may be continuous. The third upper surface 401*a* of the third layer 400*a* may form the first major surface 101*a* of the protective coating 100*a*. State otherwise, the first major surface 101*a* of the protective coating 100*a* may comprise the third upper surface 401*a* of the third layer 400*a*.

The third layer 400*a* may seal the second layer 300*a* from the first major surface 101*a* of the protective coating 100*a*. The third layer 400*a* may seal the first layer 200*a* from the first major surface 101*a* of the protective coating 100*a*.

Referring now to FIG. 3B, the third layer 400*a*, the second layer 300*a* and the first layer 200*a* may be arranged such that the particulate 310*a* may comprise a first portion 311*a* and a second portion 312*a*. The first portion 311*a* of the particulate 310*a* may at least partially penetrate into the first layer 200*a*. The first portion 311*a* of the particulate 310*a* may at least partially penetrate into the first layer 200*a* thereby overlapping with the first thickness $t_1$ of the first layer 200*a*. The first portion 311*a* of the particulate 310*a* may at least partially penetrate into the first layer 200*a* thereby being located between the first upper surface 201*a* and the first lower surface 202*a* of the first layer 200*a*.

The second portion 312*a* of the particulate 310*a* may be located above the first layer 200*a*. The second portion 312*a* of the particulate 310*a* may be located above the first layer 200*a* such that the particulate 310 does not overlap with the first thickness $t_1$ of the first layer 200*a*. The second portion 312*a* of the particulate 310*a* may be located above the first layer 200*a*. The third layer 400*a* may be located entirely above the first layer 200*a*. The third layer 400*a* may be located entirely above the first portion 311*a* of the particulate 310*a*. The third layer 400*a* may encapsulate each of the second portion 312*a* of each particulate 310*a*.

The second portion 312*a* of the particulate 310*a* located above the first layer 200*a* in combination with the third layer 400*a* may create a varied topography 150*a* on the first major surface 101*a* of the protective coating 100*a*. Stated otherwise, the first major surface 101*a* of the protective coating 100*a* may comprise a varied topography that is the result of the second portion 312*a* of the particulate 310*a* that extends beyond the first upper surface 201*a* of the first layer 200*a* with the third layer 400*a* applied thereto.

According to some of the embodiments shown in FIGS. 3A and 3B, the first major surface 101*a* of the protective coating 100*a* may be formed by the third layer 400*a*.

The protective coating 100*a* may be formed by spray applying the first coating composition to the exposed major surface 11*a* of the substrate 10*a* in the wet-state (i.e., with liquid carrier). Subsequently, before the first coating composition is fully dried (i.e., before the liquid carrier is evaporated), the second coating composition is applied to the layer of the first coating composition. Subsequently, the third coating composition may be applied to the layer of the first coating composition and second coating composition.

Subsequently, the liquid carrier of the first coating composition and the third coating composition may be driven off (e.g., evaporated) to form the protective coating 100*a* for a drying period. In some embodiments, the liquid carrier of the first coating composition, with the second coating composition applied, may be driven off (e.g., evaporated) before application of the third coating composition, followed by a second drying step for the third coating composition to form the third layer 400.

In some embodiments, the drying period may be accelerated by heating the previously applied first coating composition and second coating composition and substrate to an elevated drying temperature. The elevated drying temperature may be achieved by an oven, IR lamp, and combinations thereof.

What is claimed is:

1. A protective coating comprising a first major surface opposite a second major surface, the protective coating comprising:

a continuous first layer comprising a first polymer, the first layer having a first thickness;

a discontinuous second layer in direct contact with the first layer comprising a particulate comprising wood and having an average particulate size;

wherein the average particle size is greater than the first thickness of the first layer, and wherein at least a first portion of the particulate penetrates into the first layer thereby overlapping with at least a portion of the first thickness, and wherein a second portion of the particulate sits above the first layer;

wherein the second major surface of the protective coating comprises the first layer;

wherein the first major surface of the protective coating comprises a varied topography formed in part by the second portion of the particulate; and wherein the protective coating has an overall thickness ranging from about 70 mils to about 200 mils.

2. The protective coating according to claim 1, wherein the particulate is selected from natural wood fiber, composite wood fiber, textile material, and blends thereof.

3. The protective coating according to claim 1, wherein the particulate is water absorbable.

4. The protective coating according to claim 1, wherein the protective coating comprises a third layer comprising a second polymer; wherein the third layer is in at least partial contact with both of the first layer and the second layer.

5. The protective coating according to claim 4, wherein the third layer forms a seal encapsulating the second portion of the particulate from the first major surface of the protective coating.

6. The protective coating according to claim 4, wherein the third layer is continuous.

7. A protective covering system comprising:

a substrate comprising a major surface;

a first layer applied to the major surface of the substrate, the first layer comprising a first polymeric material, the first layer being continuous and removably bonded to the major surface;

a second layer comprising a particulate applied directly to the first layer, the second layer being discontinuous, the particulate comprising wood or cellulosic particulate and having a particulate size greater than a thickness of the first layer, a first portion of the particulate penetrating into the first layer and a second portion of the particulate sits above the first layer;

wherein the second portion of the particulate sitting above the first layer forms a varied topography.

8. The protective covering system according to claim 7, wherein the particulate is selected from fibrous material, polymeric material, and combinations thereof.

9. The protective covering system according to claim 8, wherein the fibrous material is selected from natural wood fiber, composite wood fiber, and blends thereof.

10. The protective covering system according to claim 7, further comprising a third layer comprising a second polymer, the third layer applied to the second layer and in partial contact with the first layer.

11. The protective covering system according to claim 7, wherein the third layer is continuous.

12. The protective covering system according to claim 7, wherein the varied topography translates through the third layer.

13. A protective coating for removably bonding to a surface, the protective coating comprising a first major surface opposite a second major surface, the protective coating comprising:

a first layer comprising a first polymer selected from rubber and silicone, the first layer having a first thickness;

a second layer applied to the first layer, the second layer comprising a cellulosic particulate and having an average particulate size, the second layer being discontinuous; and a third layer applied to the second layer, the third layer comprising a second polymer matrix, the third layer being continuous and located entirely above the first layer;

wherein the average particle size of the cellulosic particulate is greater than the first thickness of the first layer;

wherein the second layer is applied such that a first portion of the second layer at least partially penetrates the first layer and at least a second portion of the second layer sits above the first layer; and wherein the third layer encapsulates the second portion of the second layer such that the first major surface of the protective coating is defined by the third layer.

14. The protective coating according to claim 13, wherein the first major surface of the protective coating comprises a varied topography defined by the third layer.

* * * * *